United States Patent [19]

Matsumoto et al.

[11] Patent Number: 4,836,642

[45] Date of Patent: Jun. 6, 1989

[54] CLADDING MATERIAL FOR OPTICAL FIBER

[75] Inventors: Tsuruyoshi Matsumoto; Katsuhiko Shimada; Yoshihiro Uozu, all of Otake, Japan

[73] Assignee: Mitsubishi Rayon Company, Ltd., Tokyo, Japan

[21] Appl. No.: 225,734

[22] Filed: Jul. 29, 1988

[30] Foreign Application Priority Data

Jul. 30, 1987 [JP] Japan .................................. 62-188818
Sep. 18, 1987 [JP] Japan .................................. 62-232043

[51] Int. Cl.$^4$ ..................... G02B 6/00; G01N 21/00; B05D 5/06; C08F 120/18
[52] U.S. Cl. ..................... 350/96.34; 350/96.30; 350/96.10; 356/73.1; 427/163; 428/364; 428/383; 526/329.7
[58] Field of Search ............. 350/96.29, 96.10, 96.30, 350/96.34; 356/73.1; 427/163; 428/364, 383; 526/329.7

[56] References Cited

U.S. PATENT DOCUMENTS

| | | | |
|---|---|---|---|
| 4,138,194 | 2/1979 | Beasley et al. | 350/96.30 |
| 4,289,398 | 9/1981 | Robichaud | 356/73.1 |
| 4,317,616 | 3/1982 | Clarke | 350/96.34 |
| 4,431,264 | 2/1984 | Clarke | 350/96.34 |
| 4,566,755 | 1/1986 | Ohmori et al. | 350/96.34 |
| 4,576,438 | 3/1986 | Tatsukami et al. | 350/96.34 |
| 4,663,185 | 5/1987 | Eckberg | 350/96.10 X |
| 4,681,400 | 7/1987 | Ueba et al. | 350/96.34 |
| 4,685,799 | 8/1987 | Brininstool | 356/73.1 |
| 4,718,748 | 1/1988 | Broer et al. | 350/96.30 |
| 4,720,166 | 1/1988 | Ohmori et al. | 350/96.34 |
| 4,738,509 | 4/1988 | Broer et al. | 350/96.34 |
| 4,775,233 | 10/1988 | Kaneshi et al. | 356/73.1 |
| 4,779,954 | 10/1988 | Tatsukami et al. | 350/96.34 |
| 4,787,709 | 11/1988 | Kawada et al. | 350/96.34 |

FOREIGN PATENT DOCUMENTS 1037498 7/1966 United Kingdom ......... 350/96.34 X

*Primary Examiner*—William L. Sikes
*Assistant Examiner*—Brian M. Healy
*Attorney, Agent, or Firm*—Oblon, Spivak, McClelland, Maier & Neustadt

[57] ABSTRACT

A cladding material for an optical fiber is described, which is made of a polymer comprised of (A) 10–90 wt. % of a long-chain fluoroalkyl group-containing monomer of the formula:

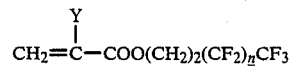

$$CH_2=\overset{Y}{\underset{|}{C}}-COO(CH_2)_2(CF_2)_nCF_3$$

wherein F is F, $CH_3$ or $CF_3$, and n is an integer from 5 to 11, (B) 5–90 wt. % of a short-chain fluoroalkyl group-containing monomer of the formula:

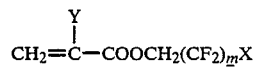

$$CH_2=\overset{Y}{\underset{|}{C}}-COOCH_2(CF_2)_mX$$

wherein Y is as defined above, X is F, $CH_3$ or $CF_3$, and m is an integer of from 1 to 4, and (C) 0–50 wt. % of other copolymerizable monomer. The melt flow index indicating the amount in gram of the polymer extruded for 10 minutes from a nozzle with an orifice having an inner diameter of 2 mm and a length of 8 mm under the conditions of a temperature of 230° C. and a load of 5 kg, is not larger than 30.

20 Claims, No Drawings

CLADDING MATERIAL FOR OPTICAL FIBER

BACKGROUND OF THE INVENTION (1) Field of the Invention

The present invention relates to a cladding material for an optical fiber. More particularly, the present invention relates to a cladding material for an optical fiber, which has an excellent adhesion to a core of an optical fiber, bending resistance and transparency. A core-clad optical fiber having this cladding material is characterized in that, even when the optical fiber is bent, a satisfactory light-transimitting property can be retained.

(2) Description of the Related Art

It is known that a core-clad optical fiber is valuable as an optical fiber, and known core-clad optical fibers are divided into three types, i.e., an optical fiber in which both ot the sheath and core are composed of plastics, an optical fiber in which the core is composed of glass and the sheath is composed of plastics, and an optical fiber in which both the core and sheath are composed of glass. Of these core-clad optical fibers, optical fibers having a sheath composed of plastics have a good flexibility and a relatively high bending resistance, and therefore, these optical fibers are easier to handle than optical fibers composed entirely of glass and are advantageously used as an intermediate-range communication medium or a light-transmitting medium of a display comprising an optical fiber.

As the clad-forming polymer for an optical fiber, a fluoroalkyl methacrylate polymer is disclosed in Japanese Examined Patent Publication No. 43-8,978, a trifluoromethyl methacrylate polymer is disclosed in Japanese Unexamined Patent Publication No. 49-107,790, and a vinylidene fluoride/tetrafluooethylene copolymer is disclosed in Japanese Examined Patent Publication No. 53-21,660.

Of these clad-forming polymers, the vinylidene fluoride/tetrafluoroethylene copolymer has a low refractive index and has excellent mechanical characteristics and adhesion to the core component. However, since this copolymer is crystalline to some extent, the copolymer has a poor transparency, and therefore, a core-clad optical fiber comprising a clad composed of this vinylidene fluoride/tetrafluoroethylene copolymer does not have the required light-transmitting characteristics.

The fluoroalkyl methacrylate polymer has a good transparency and a low refractive index, but the light-transmitting property of a core-clad optical fiber comprising a clad composed of this polymer is easily lost by bending.

Accordingly, investigations have been made into the development of cladding materials not having the above-mentioned defects. For example, Japanese Unexamined Patent Publication No. 61-66,706 discloses, as the cladding polymer, a copolymer comprising 30 to 60% by weight of a long-chain fluoroalkyl methacrylate represented by the following formula:

30 to 60% by weight of a short-chain methacrylate represented by the following formula:

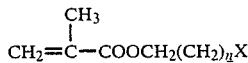

wherein X is H or F, and n is an integer of from 1 to 4, 20 to 50% by weight of a short-chain fluoroalkyl methacrylate represented by the following formula:

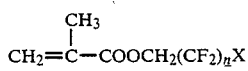

wherein X is H or F and n is an integer of from 1 to 4, and 20 to 50% by weight of methyl methacrylate The clad composed of this copolymer has a higher adhesion to the core of the optical fiber and a higher bending resistance than the conventional clad of the perfluoroalkyl methacrylate copolymer, and the optical fiber having this clad showed a high bending resistance of about 15 to 16 bending at the 180° bending test.

In this optical fiber, however, the light-transmitting property is drastically degraded in the bent state. For example, supposing that the light-transmittance of this optical fiber is evaluated as 100 in the normal state, the light-transmitting property is reduced substantially to zero and light is not transmitted at all in the state where the optical fiber is wound by 100 turns on a round rod having a diameter of 10 mm. If the optical fiber is unwound from the round rod and straightened and the light-transmitting property is measured again, the light-transmitting property is then as low as 40 to 60.

Conventional optical fibers having a plastic core have a higher flexibility than glass type optical fibers and it is considered that these optical fibers have a good processability and are ease to handle. But, as pointed out above, the light-transmitting property is drastically degraded in the bent state and the light-transmitting property is very low when the optical fibers are released from the bent state, and thus these optical fibers are not suitable for use as communication media. Therefore, the developement of optical fibers in which these points have been improved is strongly desired.

SUMMARY OF THE INVENTION

The present inventors carried out research into the development of an optical fiber which does not have the above-mentioned defects, and as a result, found that this can be attained by a core-clad optical fiber in which the light transmittance retention ratio Ia/Io when wound satisfies the requirement represented by the following formula (I):

$$Ia/Io \times 100 \geqq 20\% \qquad (I)$$

and preferably, the light transmittance recovery ratio Ib/Io when unwound satisfies the requirement represented by the following formula (II):

$$Ib/Io \times 100 \geqq 80\% \qquad (II)$$

wherein Io stands for the intensity of transmitted light measured when parallel light having a specific wavelength is made incident from one end of the optical fiber having a length of 10 m and emitted from the other end thereof, Ia stands for the intensity of transmitted light obtained when the optical fiber is wound by 100 turns on a rod-shaped mandrel having a diameter of 10 mm and the measurement is conducted in the same manner as described above, and Ib stands for the intensity of transmitted light obtained when the wound optical fiber is unwound from the mandrel and the measurement is conducted in the same manner as described above. The present invention was completed based on this finding.

The cladding material for an optical fiber of the present invention consists essentially of a fluorine-containing copolymer comprising (A) 10 to 90% by weight of a monomer having a long-chain fluoroalkyl group, which is represented by the following general formula (III):

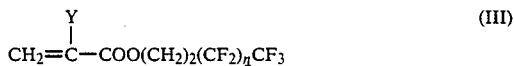

wherein Y is F, CH$_3$ or CF$_3$, and n is an integer of from 5 to 11. (B) 5 to 90% by weight of a monomer having a short-chain fluoroalkyl group, which is represented by the following general formula (IV):

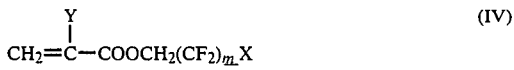

wherein Y is as defined above, X is F, CF$_3$ or CH$_3$, and m is an integer of from 1 to 4, and (C) 0 to 50% by weight of other copolymerizable monoethylenically unsaturated monomer, in which the melt flow index indicating the amount in gram of the copolymer extruded for 10 minutes from a nozzle with an orifice having an inner diameter of 2 mm and a length of 8 mm under the conditions of a temperature of 230° C. and a load of 5 kg is not larger than 30, preferably at least 2, and the intrinsic viscosity [η] is at least 0.4 dl/g.

DESCRIPTION OF THE PREFERRED EMBODIMENTS

In the copolymer constituting the cladding material for the optical fiber according to the present invention, the copolymerization ratio of the monomer having a long-chain fluoroalkyl group, which is represented by the general formula (III), is 10 to 90% by weight, preferably 10 to 70% by weight. In a copolymer in which the copolymerization ratio of this monomer is higher than 90% by weight, the glass transition temperature determined from E" measured by a viscoelastometer cannot be elevated beyond 50° C., and a cladding material having a good heat resistance cannot be obtained. If the copolymerization ratio of the monomer of the formula (III) is lower than 10% by weight, the copolymer tends to have a high refractive index and the aptitude of the copolymer for use as a cladding material is reduced. The copolymer in which the copolymerization ratio of the monomer of the formula (III) is 10 to 90% by weight has a refractive index preferable for a cladding material, a high bending resistance, a high adhesion to the core and a high glass transition temperature indicating a high heat resistance, and therefore, an excellent cladding material can be provided.

In the copolymer constituting the cladding material of the present invention, the copolymerization ratio of the comonomer having a short-chain fluoroalkyl group, which is represented by the general formula (IV), is 5 to 90% by weight, preferably to 90% by weight. The copolymer in which the copolymerization ratio of this comonomer exceeds 90% by weight tends to have a high refractive index, the glass transition point is too high and the bending resistance is low, and thus a satisfactory cladding material cannot be provided. The copolymer in which the copolymerization ratio of this short-chain fluoroalkyl group-containing monomer to be copolymerized with the long-chain fluoroalkyl group-containing monomer is lower than 5% by weight is opaque and, since the glass transition point is too low, the optical fiber comprising this copolymer as the cladding material has a poor heat resistance.

In general, if a fluorine-containing polymer having an appropriate refractive index and an appropriate glass transition point is prepared by copolymerizing a short-chain fluoroalkyl methacrylate with a long-chain fluoroalkyl methacrylate, problems such as opacification or turbidity often arise, but, if the above-mentioned monomers are copolymerized at the above-mentioned composition ratios according to the present invention, a transparent copolymer having an appropriate refractive index, a high glass transition point and an excellent adhesion to the core can be obtained.

As specific examples of the monomer represented by the general formula (III), there can be mentioned methacrylates, a-fluoroacrylates and a-trifluoromethyl acrylates having, as the long-chain fluoroalkyl group, a 1,1,2,2-tetrahydroperfluorooctyl group, a 1,1,2,2-tetrahydroperfluorodecanyl group, a 1,1,2,2-tetrahydroperfluorododecanyl group or a 1,1,2,2-tetrahydroperfluorotetradecanyl group. These monomers may be used singly or in the form of a mixture of two or more thereof.

As specific examples of the monomer represented by the general formula (IV), there can be mentioned methacrylates, a-fluoroacrylates and a-trifluoroacrylates having, as the short-chain fluoroalkyl group, a trifluoroethyl group, a 2,2,3,3-tetrafluoropropyl group, a 2,2,3,3,3-pentafluoropropyl group or a 2,2,3,3,4,4,5,5-octafluoropentyl group. These monomers can be used singly or in the form of a mixture of two or more thereof.

As the other copolymerizable monoethylenically unsaturated monomer that can be copolymerized with the monomer of the formula (III) and the monomer of the formula (IV), there can be mentioned methacrylates, acrylates and a-fluoroacrylates having a linear alkyl group, methacrylic acid esters having a cyclic hydrocarbon group,and vinyl monomers having a hydrophilicgroup. As the linear alkyl (meth)acrylate, there can be mentioned methyl (meth)acrylate, ethyl (meth)acrylate, n-propyl (meth)acrylate, isopropyl (meth)acrylate, n b-butyl (meth)acrylate and sec-butyl (meth)acrylate. Of these, methyl methacrylate is preferred. As the methacrylic acid ester having a cyclic hydrocarbon group, there can bre mentioned phenyl methacrylate, cyclohexyl methacrylate, adamantyl methacrylate, (iso)bornyl methacrylate and tricyclo[5.2.1.o$^{2,6}$]-decan-8yl methacrylate. As the vinyl monomer having a hydrophilic group, there can be mentioned unsaturated carboxylic acis such as (meth)acrylic acid, maleic acid and maleic anhydride, maleimide, glycidyl methacrylate, methylglycidyl methacrylate, acrylamide, 2-hydroxyethyl (meth)acrylate and 2-hydroxypropyl (meth)acrylate. If a monomer as mentioned above is copolymerized for formation of the copolymer of the present invention, the adhesion to the core is further improved and the resistance to thermal degradation is enhanced, and an especially high effect is attained when an unsaturated carboxylic acid is used.

Preferably these copolymerizable monomers are used in an amount of up to 50% by weight, especially 0.1 to 20% by weight, based on the total weight of the monomers for copolymerization.

The cladding polymer of the present invention can be prepared according to the suspension polymerization process, the bulk polymerization process or the solution polymerIzation process. As the polymerization initiator to be used for the polymerization, there can be mentioned azo compounds such as 2,2'-(azobisisobutyronitrile), 1,1' azobis (cyclohexanecarbonitrile), 2,2'-azobis(2,4-dimethylvalerontrile), azobisisobutanol and diacetatoazo-t-butane, and organic peroxides such as t-butyl peroxide, dicumyl peroxide, di-t-butyl perphthalate, di-t-butyl peracetate and di-t-amyl peroxide. Preferably the amount of the polymerization initiator used is 0.001 to 1 mole% based on the monomers.

The fluorine-containing polymer having the above-mentioned composition has a refractive index suitable for the cladding material, a good adhesion to the core and a high transparency that should be possessed by the cladding material, but, if subjected to a severe bending test, the light-transmitting property thereof is readily degraded. The inventors have carried out research into the provision of a cladding polymer having the above-mentioned composition, in which this defect is eliminated, and as a result, found that the polymer having the above-mentioned defect is characterized in that the melt flow index indicatiing the flowability of the polymer is large.

According to the present invention, a cladding polymer for an optical fiber in which the above-mentioned defect is eliminated can be obtained by controlling the melt flow index to a value not larger than 30. A polymer having a melt flow idex larger than 30 has a poor resistance to bending deformation, and therefore, if a core-clad optical fiber comprising this polymer as the cladding material is bent, a structural change occurs in the core-clad interface and the light-transmitting property is reduced substantially to zero, and even if the optical fiber is released from this bent state, the light-transitting property is still restrained to a low level. In contrast, in the core-clad optical fiber comprising the cladding material of the present invention having a melt flow index not larger than 30, preferably a melt flow index of 2 to 25, little structural change occurs in the core-clad interface even when bent and the opitcal fiber still has a light-transmitting property, and if the optical fiber is released from the bent state, the light-transmitting property is restored. Accordingly, the optical fiber of the present invention has a very stable core-clad interface structure.

To obtain an optical fiber having the preferable properties as mentioned above, preferably the intrinsic viscosity [$\eta$] (as measured in methyl ethyl ketone as the solvent) of the cladding polymer of the present invention is at least 0.4 dl/g. If a cladding polymer satisfying this requirement is used, an optical fiber showing further improved light-transmitting characteristics when bent can be obtained.

To further improve the heat resistance of the optical fiber of the present invention, preferably the cladding polymer having the above-mentioned composition has a glass transition temperature (Tg) of at least 50° C. as determined from the peak value of E'' obtained by measuring the viscoelasticity. Even if a core-clad optical fiber comprising a cladding polymer having a glass transition temperature (Tg) of at least 50° C. is exposed to a hot atmosphere maintained at a temperature higher than 80° C. for a long time, little structural change occurs in the core-clad interface and good light-transmitting characteristics are maintained.

A polymer having the above-mentioned characteristic properties can be obtained by polymerizing the monomer having a short-chain fluoroalkyl group, the monomer having a long-chain fluoroalkyl group and the optional other copolymerizable monomer at a composition such that opacification is not caused and the desired Tg and refractive index are obtained, while adjusting the amount of the polymerization initiator and/or the chain transfer agent and the polymerization reaction temperature. For example, n-butylmercaptan, t-butylmercaptan, n-octylmercaptan and n-dodecylmercaptan can be used as the chain transfer agent. The chain transfer agent is used in an amount smaller than about 1 mole% based on the monomers.

A transparent organic polymer is preferably used as the core component of the optical fiber of the present invention. For example, there can be mentioned poly(methyl methacrylate), polystyrene, polycarbonate, poly-4-methylpentene-1, deuterated poly(methyl methacrylate), deuterated polystyrene, a methyl methacrylate copolymer composed mainly of methyl methacrylate, especially a methyl methacrylate copolymer containing at least 70% by weight of methyl methacrylate, and a deuteration product thereof. As the monomer copolymerizable with methyl methacrylate, there can be mentioned acrylic acid esters such as methyl acrylate, ethyl acrylate, propyl acrylate, n-butyl acrylate, t-butyl acrylate and 2-ethylhexyl acrylate and methacrylic acid esters such as bornyl methacrylate, adamantyl methacrylate, cyclohexyl methacrylate, benzyl methacrylate, ethyL methacrylate, propyl methacrylate and butyl methacrylate.

As the other heat-resistant resin, a copolymer comprising methyl methacrylate units and at least 2% by weight of glutarimide units represented by the following general formula can be used.

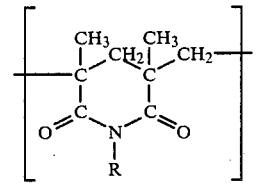

wherein R stands for an aliphatic hydrocarbon group, a benzyl group or a cyclohexyl group.

The optical fiber of the present invention can be prepared by forming a core fiber and then coating a melt of a clad-forming polymer on the surface of the core fiber, or coating a solution of a clad-forming polymer in a solvent such as ethyl acetate, dimethylformamide or dimethylacetamide on the surface of the core fiber and then removing the solvent, or by carrying out conjugate spinning by using a core-clad true conjugate spinning apparatus. The thus-formed core-clad fiber is preferably drawn at a temperature higher than the glass transition temperature of the core-forming polymer but lower than the temperature higher by 80° C. than the glass transition temperature of the clad-forming fluorine-containing polymer.

The core-clad optical fiber of the present invention is characterized in that the light transmittance retention ratio Ia/Io when wound satisfies the requirement represented by the following formula (I):

$$Ia/Io \times 100 \geqq 20\% \quad (I)$$

and preferably, the light transmittance recovery ratio Ib/Io when unwound satisfies the requirement represented by the following formula (II):

$$Ib/Io \times 100 \geqq 80\% \quad (II)$$

wherein Io stands for the intensity of transmitted light through the length of the optical fiber having a length of 10 m measured with respect to light having a specific wavelength, Ia stands for the intensity of transmitted light measured in the same manner when the optical fiber is wound by 100 turns on a rod-shaped mandrel having a diameter of 10 mm, and Ib stands for the intensity of transmitted light measured in the same manner when the optical fiber is unwound from the mandrel.

The optical fiber in which the value of Ia/Io×100 is smaller than 20% has an unsatisfactory bending resistance, and if the optical fiber is bent a structural change often occurs in the core-clad interface and therefore, a good processability cannot be obtained.

In the optical fiber in which the value of Ib/Io×100 is smaller than 80%, the structural change caused in the core-clad interface is not removed even if the bending strain is removed, and a good handling property cannot be obtained.

To obtain an optical fiber having the above-mentioned characteristics, the properties of the cladding polymer of the core-clad optical fiber, especially the polymer composition, and the melt flow index and intrinsic viscosity of the polymer, must be strictly controlled.

As pointed out hereinbefore, the optical fiber of the present invention is superior to the conventional optical fibers in that the light-transmitting characteristics are satisfactory even in bent state and when the optical fiber is released from the bent state very good optical characteristics are restored. Accordingly, the optical fiber of the present invention has a very high reliability as a light-trasmitting medium.

The present invention will now be described in detail with reference to the following examples, which in no way limit the present invention.

EXAMPLE 1

A monomer comprising 63% by weight of 2,2,2-trifluooethyl methacrylate, 20% by weight of 1,1,2,2-tetrahydroperfluorodecyl methacrylate, and 17% by weight of methyl methacrylate, and incorporated therein, 0.05% by weight based on the monomers of n-octadecylmercaptan and 0.1% by weight based on the monomers of 2,2'-azobisisobutyronitrile, was prepared in an oxygen tree atmosphere, and polymerization was conducted for 8 hours in a reaction vessel maintained at 70° C., then further conducted at 120° C. for 2 hours. The refractive index of the obtained polymer was 1.4195, the quantity (melt flow index value) of the polymer extruded for 10 minutes of 8 mm at 230° C. under a load of 5 kg was 5.4, and the intrinsic viscosity of the polymer was 0.68 as determined at 25° C. in methyl ethyl ketone. The glass transition temperature (Tg) determined from the peak of E″ measured by a visoelastometer was 95.4° C. This polymer as the clad and poly(methyl methacrylate) as the core were spun by an conjugate melt-spinning apparatus having a core-clad spinneret and drawn at a draw ratio of 1.5 under dry heating at 130° C. to obtain an optical fiber having a core diameter of 980 μm and a sheath thickness of 10 μm.

The attenuation of light transmittance of the optical fiber was 92 dB/km at 570 nm and 154 dB/km at 650 nm. After the optical fiber had been allowed to stand in air maintained at 85° C. for 1000 hours, the attenuation of light transmittance was 95 dB/km at 590 nm and 159 dB/km at 650 n. When the optical fiber having a length of 10 m was wound repeatedly on a 22 mandrel having a diameter of 10 mm and the light transmittance retention ratio on winding was determined, to evaluate the bending resistance of the optical fiber, it was found that the light transmittance retention ratio was 31.4% when the optical fiber was wound by turns, and that when the optical fiber was unwound, the light transmittance recovery ratio was 89.1%.

EXAMPLES 2 THROUGH 6 AND COMPARATIVE EXAMPLES 1 AND 2

Fluorine-containing resins having the compositions, melt indexes and intrinsic viscosities shown in Table 1 were prepared by using the monomer mixtures shown in Table 1 and adjusting the amount of the polymerization initiator and chain transfer agent, and the polymerization temperature.

Optical fibers were prepared in the same manner as described in Example 1 by using these fluorine-containing resins as the sheath and poly(methyl methacrylate) as the core, and the characteristics of these optical fibers were determined in the same manner as described in Example 1. The results are shown in Table 1.

Symbols shown in Table 1 indicate the following compounds.

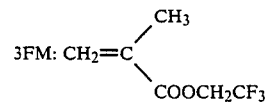

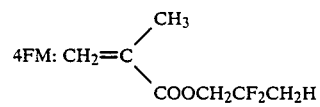

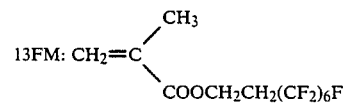

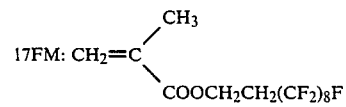

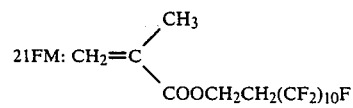

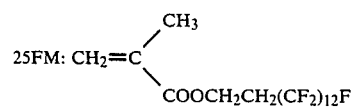

MMA: methyl methacrylate
MAA: methacrylic acid

TABLE 1

| | 3 Fm | 4 Fm | 13 Fm | 17 Fm | 21 Fm | 25 Fm | MMA | MAA | Melt index | Intrinsic viscosity | Tg (°C.) | Refractive index $n_D^{25}$ |
|---|---|---|---|---|---|---|---|---|---|---|---|---|
| Example 1 | 63 | — | — | 20 | — | — | 17 | — | 5.4 | 0.68 | 95.4 | 1.4195 |
| Comparative Example 1 | 63 | — | — | 20 | — | — | 17 | — | 61.5 | 0.29 | 95.3 | 1.4197 |
| Example 2 | 20 | — | — | 60 | — | — | 17 | 3 | 11.0 | 0.53 | 65.3 | 1.4081 |
| Comparative Example 2 | 20 | — | — | 60 | — | — | 17 | 3 | 63.0 | 0.25 | 65.1 | 1.4082 |
| Example 3 | 5 | — | — | 90 | — | — | 4 | 1 | 11.1 | 0.55 | 47.8 | 1.3609 |
| Example 4 | — | 76 | — | 5 | 10 | — | 9 | — | 8.5 | 0.67 | 87.1 | 1.4091 |
| Example 5 | 20 | — | 16 | 21 | 15 | 9 | 18 | 1 | 9.0 | 0.64 | 64.2 | 1.4092 |
| Example 6 | 28 | 25 | — | 20 | — | — | 27 | — | 6.0 | 0.68 | 86.1 | 1.4271 |

| | Drawing conditions C × draw ratio | Attenuation (dB/km) (570 nm) Room temperature | Attenuation (dB/km) (570 nm) After Standing at 85° C. for 1000 hours | Light transmittance retention ratio when wound (%) | Light transmittance recovery ratio when unwound (%) |
|---|---|---|---|---|---|
| Example 1 | 130° C. × 1.5 | 92 | 95 | 31.4 | 89.1 |
| Comparative Example 1 | 130° C. × 1.5 | 89 | 93 | 0 | 45.9 |
| Example 2 | 140° C. × 2.5 | 90 | 92 | 33.2 | 96.1 |
| Comparative Example 2 | 140° C. × 2.5 | 91 | 94 | 0 | 56.1 |
| Example 3 | 125° C. × 1.5 | 93 | 132 | 34.1 | 97.3 |
| Example 4 | 135° C. × 2.0 | 88 | 92 | 30.9 | 87.9 |
| Example 5 | 140° C. × 2.5 | 92 | 94 | 34.1 | 95.3 |
| Example 6 | 140° C. × 2.5 | 87 | 89 | 38.1 | 89.9 |

EXAMPLE 7

A core-clad optical fiber having a diameter of 1,000 μm was obtained in the same manner as described in Example 1 by conjugate-spinning polycarbonate as the core polymer and the clad-forming polyer prepred in Example 1, whichhad a glass transition temperature (Tg) of 95.4° C., a melt flow index of 5.4, an intrinsic viscosity [η] of 0.68, and a refractive index $n_D^{25}$ of 1.4195 and had been prepared from a monomer composition 3FM/17FM/MMA of 63/20/17.

The attenuation of the optical fiber was 704 dB/km when the measurement was conducted with respect to light having a wavelength of 770 nm, the light transmittance retention ratio when would was 69.2%, and the light transmittance recovery ratio when unwound was 96.2%.

We claim:

1. A cladding material for an optical fiber, which consists essentially of a fluorine-containing polymer comprising (A) 10 to 90% by weight of a long-chain fluoroalkyl group-containing monomer represented by the following general formula:

wherein Y if F, CH₃ or CF₃, and n is an integer from 5 to 11, (B) 5 to 90% by weight of a short-chain fluoroalkyl group-containing monomer represented by the following general formula:

wherein Y is as defined above, X is F, CH₃ or CF₃, and m is an integer of from 1 to 4. and (C) 0 to 50% by weight of other copolymerizable monoethylenically unsaturated monomer, wherein the melt flow index indicating the amount in gram of the polymer extruded for 10 minutes from a nozzle with an orifice having an inner diameter of 2 mm and a length of 8 mm under conditions of a temperature of 230° C. and a load of 5 kg, is not larger than 30.

2. A cladding material as set forth in claim 1, wherein the melt flow index of the fluorine-containing polymer is 2 to 25.

3. A cladding material as set forth in claim 1 or 2, wherein the fluorine-containing polymer has an intrinsic viscosity of at least 0.4 dl/g.

4. A cladding material as set forth in claim 1 of 3, wherein the fluorine-containing polymer has a glass transition temperature of at least 50° C. as determined from the peak value of E" obtained by the measurement of the viscoelasticity.

5. A cladding material as set forth in claim 1, wherein the fluorine-containing polymer comprises (A) 10 to 70% by weight of the long-chain fluoroalkyl group-containing monomer, (B) 10 to 90% by weight of the short-chain fluoroalkyl group-containing monomer, and (C) 0 to 50% by weight of the monoethylenically unsaturated monomer.

6. A cladding material as set forth in claim 1 or 3, wherein the other copolymerizable monoethylenically unsaturated monomer (C) is methyl metachrylate and the copolymerization ratio thereof is 0.1 to 20% by weight.

7. A cladding material as set forth in claim 1 or 3, wherein the other copolymerizable monoethylenically unsaturated monomer (C) is an unsaturated carboxylic acid and the copolymerization ratio thereof is 0.1 to 10% by weight.

8. a cladding material as set forth in claim 7, wherein the unsaturated carboxylic acid (C) is methacrylic acid.

9. A core-clad optical fiber in which the light transmittance retention ratio Ia/Io when wound satisfies the requirement represented by the following formula:

$$Ia/Io \times 100 \geqq 20\%$$

wherein Io stands for the intensity of transmitted light measured when parallel light having a specific wavelength is made incident from one end of the optical fiber having a length of 10 m and emitted from the other end thereof, and Ia stands for the intensity of transmitted light obtained when the optical fiber is wound by 100 turns on a rod-shaped mandrel having a diameter of 10 mm and the measurement is conducted in the same manner as described above.

10. A core-clad optical fiber as set forth in claim 9, wherein the sheath consists essentially of a fluorine-containing polymer comprising (A) 10 to 90% by weight of a long-chain fluoroalkyl group-containing monomer represented by the following general formula:

$$CH_2=\overset{Y}{\underset{|}{C}}-COO(CH_2)_2(CF_2)_nCF_3$$

wherein Y is F, CH$_3$ or CF$_3$, and n is an integer of from 5 to 11, (B) 5 to 90% by weight of a short-chain fluoroalkyl group-containing monomer represented by the following general formula:

$$CH_2=\overset{Y}{\underset{|}{C}}-COOCH_2(CF_2)_mX$$

wherein Y is as defined above, X is F, CH$_3$ or CF$_3$, and m is an integer of from 1 to 4, and (C) 0 to 50% by weight of other copolymerizable monoethylenically unsaturated monomer, and the melt flow index indicating the amount in gram of the polymer extruded for 10 minutes from a nozzle with an orifice having an inner diameter of 2 mm and a length of 8 mm under the conditions of a temperature of 230° C. and a load of 5 kg, is not larger than 30.

11. A core-clad optical fiber as set forth in claim 10, wherein the fluorine-containing polymer has an intrinsic viscosity of at least 0.4 dl/g.

12. A core-clad optical fiber as set forth in claim 10, wherein the fluorine-containing polymer has a glass transition temperature of at least 50° C. as determined from the peak value of E" obtained by the measurement of the viscoelasticity.

13. A core-clad optical fiber as set forth in claim 10, wherein the fluorine-containing polymer comprises (A) 10 to 70% by weight of the long-chain fluoroalkyl group-containing monomer, (B) 10 to 90% by weight of the short-chain fluoroalkyl group-containing monomer, and (C) 0 to 50% by weight of the monoethylenically unsaturated monomer.

14. A core-clad optical fiber as set forth in claim 10, wherein the other copolymerizable monoethylenically unsaturated monomer (C) is methyl methacrylate or an unsaturated carboxylic acid.

15. A core-clad optical fiber as set forth in claim 8, wherein the light transmittance recovery ratio Ib/Io when unwound satisfies the requirement represented by the following formula:

$$Ib/Io \times 100 \geqq 80\%$$

wherein Io is as defined in claim 8, and Ib stands for the intensity of transmitted light measured when the optical fiber wound in the same manner as set forth in claim 8 is unwound from the mandrel and the measurement is conducted in the same manner as set forth in claim 8.

16. A core-clad optical fiber as set forth in claim 13, wherein the clad consists essentially of a fluorine-containing polymer comprising (A) 10 to 90% by weight of a long-chain fluoroalkyl group-containing monomer represented by the following general formula:

$$CH_2=\overset{Y}{\underset{|}{C}}-COO(CH_2)_2(CF_2)_nCF_3$$

wherein Y is F, CH$_3$ or CF$_3$, and n is an integer of from 5 to 11, (B) 5 to 90% by weight of a short-chain fluoroalkyl group-containing monomer represented by the following general formula:

$$CH_2=\overset{Y}{\underset{|}{C}}-COOCH_2(CF_2)_mX$$

wherein Y is as defined above, X is F, CH$_3$ or CF$_3$, and m is an integer of from 1 to 4, and (C) 0 to 50% by weight of other copolymerizable monoethylenically unsaturated monomer, and the melt flow index indicating the amount in gram of the polymer extruded for 10 minutes from a nozzle with an orifice having an inner diameter of 2 mm and a length of 8 mm under the conditions of a temperature of 230° C. and a load of 5 kg, is not larger than 30.

17. A core-clad optical fiber as set forth in claim 16, wherein the fluorine-containing polymer has an intrinsic viscosity of at least 0.4 dl/g.

18. A core-clad optical fiber as set forth in claim 16, wherein the fluorine-containing polymer has a glass transition temperature of at least 50° C. as determined from the peak value of E″ obtained by the measurement of the viscoelasticity.

19. A core-clad optical fiber as set forth in claim 16, wherein the fluorine-containing polymer comprises (A) 10 to 70% by weight of the long-chain fluoroalkyl group-containing monomer, (B) 10 to 90% by weight of the short-chain fluoralkyl group-containing monomer, and (C) 0 to 50% by weight of the monoethylenically unsaturated monomer.

20. A core-clad optical fiber as set forth in claim 16, wherein the other copolymerizable monoethylenically unsaturated monomer (C) is methyl methacrylate or an unsaturated carboxylic acid.

* * * * *